April 28, 1970    H. T. HARTWICK, JR    3,508,472
VALVE ACTUATOR

Filed March 26, 1968      3 Sheets-Sheet 1

INVENTOR.
Harry T. Hartwick, Jr.
BY
Green, McCallister & Miller
HIS ATTORNEYS

April 28, 1970  H. T. HARTWICK, JR  3,508,472
VALVE ACTUATOR

Filed March 26, 1968  3 Sheets-Sheet 2

INVENTOR.
Harry T. Hartwick, Jr.
BY
Green, McCallister & Miller
HIS ATTORNEYS

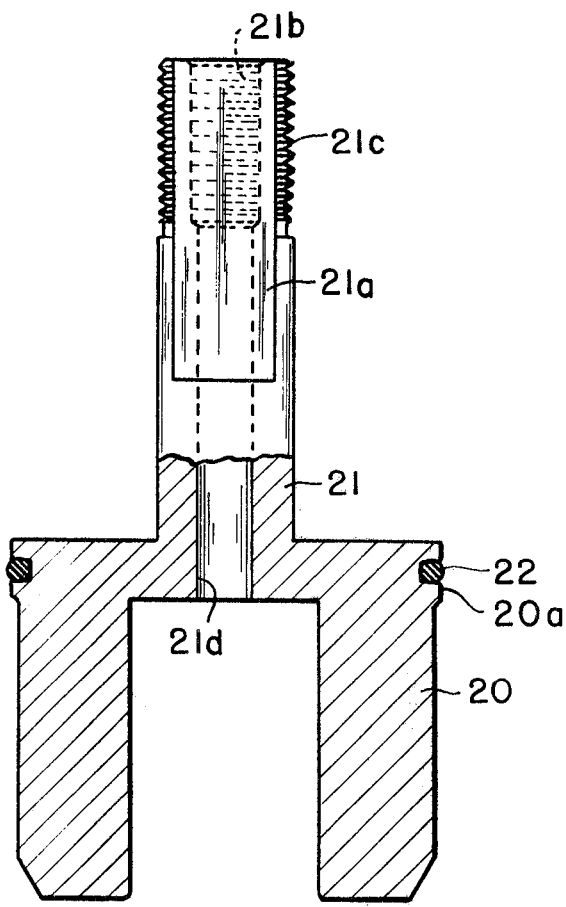
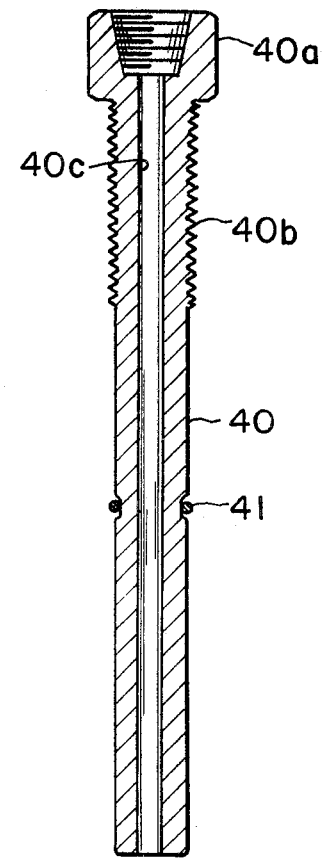
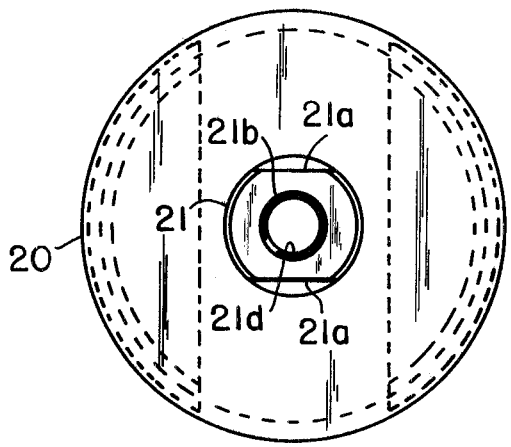
Fig. 7
Fig. 9
Fig. 8
INVENTOR.
Harry T. Hartwick, Jr.
HIS ATTORNEYS United States Patent Office 3,508,472
Patented Apr. 28, 1970

3,508,472
VALVE ACTUATOR
Harry T. Hartwick, Jr., McKeesport, Pa., assignor to Pittsburgh Brass Manufacturing Company, Pittsburgh, Pa., a corporation of Pennsylvania
Filed Mar. 26, 1968, Ser. No. 716,146
Int. Cl. F01b 3/00, 9/02
U.S. Cl. 92—13                                    7 Claims

ABSTRACT OF THE DISCLOSURE

A three-stage device or transducer for actuating or operating valves is provided having cooperating primary and secondary pistons capable of providing a pair of forward stroke stages. The first forward stage may be set for a valve shaft amount of rotation representing the opening of one port or a desired percentage of valve opening, up to a 90° plus or minus of rotation. The second forward stage may be set for an additional 90° plus or minus of rotation, which position may represent the opening of a second port or a full opening of the valve. The forward movement of both the primary and secondary pistons is positively limited by mechanical means. The secondary piston has an inner cooperating relation with the primary piston and through the agency of mating helix portions, translates forward and backward fluid-actuated piston movement into rotary (clockwise and counterclockwise) valve shaft movement. In a first stage forward stroke, both pistons advance together, and in a second stage or final forward stroke, only the secondary piston advances. In a third or return stage backward stroke, the operation is reversed; the secondary piston moves first and then both pistons move together to complete the return stroke.

---

The present invention relates to an improved actuator device suitable for multi-port as well as straightaway valves and more particularly, to a three-stage valve actuator device for converting fluid pressure into valve-actuating forward and backward rotary motion.

John et al. in their U.S. Patent No. 3,253,517 show an actuator operated by a single piston which has a single forward stroke setting and is better operated by a hydraulic fluid that lacks the compressibility of air. Since the forward stroke of the piston produces only one given rotation, usually ¼ of a turn, the device is only suitable for actuating straightaway valves; no satisfactory way has been found to stop the forward movement of the piston at any desired percentage of its forward movement. A balanced air control regulator applied to the device, produces an unreliable operation due to variations in fluid line pressure that occur. For example, if a normal 100 pounds of fluid line pressure is being applied, there is no way to compensate for either a drop of line pressure or volume.

Thus, it has been an object of the invention to devise an actuator that solves the problem involved and that is practical in usage.

Another object has been to provide an improved actuation of a multi-port or three-way valve.

Another object has been to positively and accurately motivate a valve through various degrees of rotation and practically, by means of a pneumatic fluid such as air.

Another object of the invention has been to provide an actuator device having stroke stages which can be positively set by mechanical means.

A further object of the invention has been to devise an actuator device having a pair of piston-controlled forward stroke stages.

A further object of the invention has been to devise an actuator device that may be adjusted to provide a return stroke that is of a different amount or greater than its combined forward strokes.

A still further object of the invention has been to develop an actuator that can be employed to provide 180 degree plus or minus rotation and with a reduced torque.

These and other objects will appear to those skilled in the art from the illustrated embodiment and the claims.

In the drawings:

FIGURE 1 is a sectional view in elevation of an actuator device constructed in accordance with the invention. In this view, the device is in what may be termed an initial or starting position for positively-controlled forward movement;

FIGURE 2 is a sectional view similar to FIGURE 1 but on a reduced scale, and illustrates the positioning of a pair of cooperating pistons when the device has been energized to simultaneously move such pistons forwardly to a first stage valve operating position; this view illustrates movement of the pair of pistons from an initial or return stroke position of FIGURE 1 to a first stage position at which, for example, one port of a valve may be opened;

FIGURE 7 is a vertical view in elevation and partial section particularly illustrating a primary, upper or back piston of the pair shown in and on the scale of FIGURE 1;

FIGURE 8 is a top plan view on the scale of and of the piston of FIGURE 7; and

FIGURE 9 is a vertical section in elevation on the scale of and showing details of the construction of an adjustment screw of the device of FIGURE 1.

Figure 1:
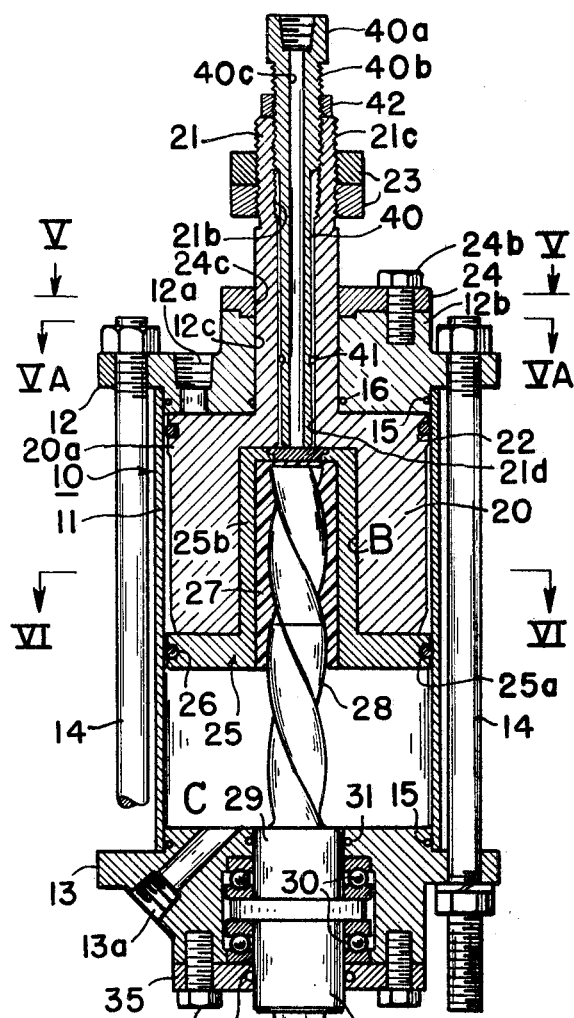

The illustrated device has a housing 10 provided with a cylindrical central body part or member 11, an upper or back end cover or closure part or member 12, and a lower or front end cover or closure part or member 13 that define a longitudinally-extending operating spacing within the housing. A starting stage of the actuator device is represented by FIGURE 1 of the drawings. At this time, where a maximum return stroke has been accomplished, an upper, back or primary piston 20 is in abutment at its upper or back end with the upper cover or closure member 12 and a cooperating lower, front or secondary piston 25 is in abutment with the upper end or connecting wall of a central or second stage chamber B within the piston 20 or with an inner end of an elongated adjustment screw 40. This positioning is preferably accomplished by applying positive fluid pressure, such as air (or an hydraulic fluid such as water or oil) to a lower, front or third stage chamber C through a bottom or front port 13a. It will be apparent that the distance of the return stroke can be varied by moving or adjusting the screw 40 within and along a hollow bore portion 21d of a central, backwardly-extending guide shaft or stem 21 of the piston 20. In FIGURE 1, the forward end of the screw 40 is substantially flush with the back wall of the central chamber B. However, if the stem 21 is turned to advance it downwardly or forwardly, its lower or front end will project into the central chamber to provide a stop for the return or upward movement of the secondary piston 25 to thus limit the amount of return stroke movement imparted to a male helix portion 28 of a drive shaft 29.

Figure 2:
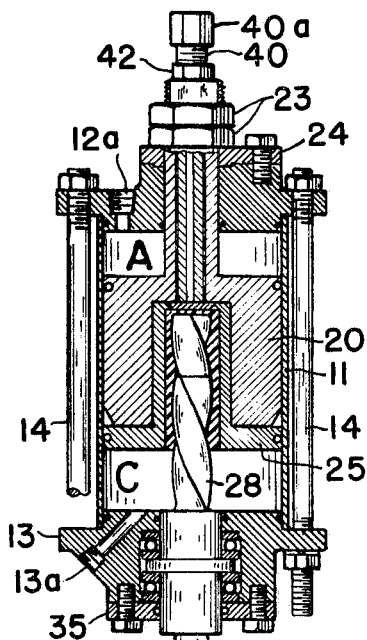

In the drawings, FIGURE 2 shows a second stage of the operation of the actuator device wherein primary and secondary pistons 20 and 25 have been moved simultaneously or as a unit forwardly or downwardly along and within the operating spacing of the housing 10 by an application of positive fluid pressure through port or tapped passageway 12a to an upper, back or first stage chamber A. At this time, lower, front or last stage chamber C may be exhausting fluid through its port 13a. The amount of the initial stage of forward movement to which the pistons 20 and 25 move or advance as a unit is controlled positively by stop nuts 23, in the sense that they mechanically limit the maximum of such movement as indicated in FIGURE 2.

Figure 3:
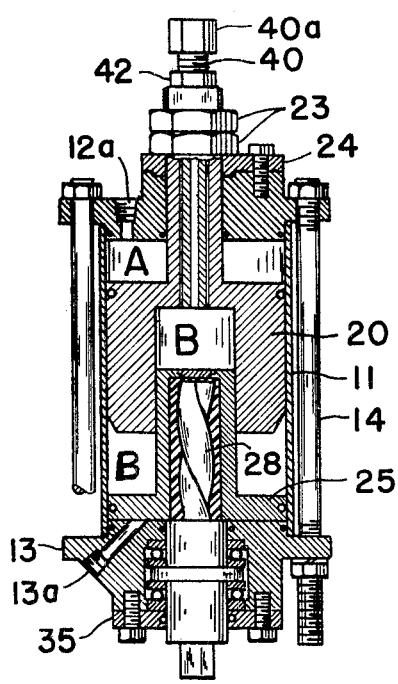
FIGURE 3 is a view similar to and on the scale of FIGURE 2 illustrating a final or second stage valve operating position of the parts of the device of FIGURES 1 and 2 after a forward, inner or second piston of the pair has been forwardly advanced to provide a second stage positioning of the valve at which, for example, a second port of the valve may be opened.

As to the second stage of forward movement which may be accomplished as desired at any time, fluid under positive pressure is introduced through tapped inlet 40a of the adjustment screw 40 along fluid port or passageway 40c into the central or second stage chamber B to advance the secondary piston 25 to a position as represented, for example, in FIGURE 3. The maximum extent of this latter movement is positively-mechanically controlled by the forward abutment of the face of a front head 25a portion of the piston 25 with an inner face of the bottom cover member 13 of the housing 10.

The return or third stage of movement of the actuator device is accomplished by applying positive fluid pressure to bottom or front chamber C through the port 13a which may first move the secondary piston 25 to an inner position within the primary piston 20 and then move the pistons 20 and 25 as a unit to the upper end of the chamber A. Ports 12a and 40c may be connected to fluid exhaust lines for the above type of operation. The piston 20 may, however, be first moved backwardly with the piston 25 by maintaining a suitable positive fluid pressure in the central chamber B.

Referring to the drawings and particularly to FIGURE 1, it will be noted that the parts 11, 12 and 13 of the housing 10 of the actuator device are removably-secured together by a group of bolt and nut assemblies 14 to define a longitudinally-extending operating spacing within the housing. The bolt and nut assemblies 14 extend in a peripherally spaced-apart relation with respect to each other through flange portions of the front and back end cover or closure parts 12 and 13 and along the outside of the central body part 11. The joints between the housing parts 11, 12 and 13 are sealed-off in a suitable manner, as by resilient O-ring gaskets 15 that are carried within groove portions of the end cover parts 12 and 13 and engage an inner wall of the central body part 11.

For supplying fluid to upper chamber A, the port 12a is shown tapped to receive a suitable valved connection, such that when the pistons 20 and 25 are being advanced forwardly, it may be connected to a positive pressure air supply line and when the pistons are moving in a return, backward or upward stroke, it may be connected to an exhaust line. In a like manner, the lower or front port 13a extends through the front or bottom cover part 13 and is tapped for alternate connection, as by means of a valve, to a positive fluid pressure supply line and to an exhaust line, such that positive fluid pressure may be applied to front or third stage chamber C when the pistons are to be moved in a return or back stroke. The port 13a may be connected to an exhaust line when one or both pistons are to be moved in a forward or down stroke.

As shown particularly in FIGURES 1 to 3, 7 and 8, the primary or what is ordinarily known as driver piston 20 is of U-shape such that its side and top end walls define central chamber B therein that is open at its bottom end to the spacing of the housing 10. The piston 20 may be of cylindrical contour to correspond to the cylindrical contour of the central body part 11; it has an upper circular head portion 20a that closes-off the central chamber B and that is provided with a groove portion for carrying an O-ring type of resilient gasket 22 for sealing-off its back and forth or longitudinal movement within the spacing of the housing 10. The stem or backwardly projecting central guide shaft portion 21 of the primary piston 20, as shown has a longitudinally-open bore 21d therethrough which extends through the back end of the piston 20 into its central chamber B for the secondary piston 25. The secondary piston 25, as shown particularly in FIGURES 1 to 3, is of inverted T-shape and has a circular front head portion 25a that is operatively-positioned forwardly within the spacing of the housing 10 and carries gasket means, such as a resilient O-ring 26 for sealing its movement off with respect to the central body part 11 of the housing. The secondary piston 25 also has a stem or centrally-backwardly-extending hollow sleeve portion 25b that is operatively-positioned within and defines an operating chamber in the central chamber B of the primary piston 20. As shown particularly in FIGURE 3, in a second stage operation of the device, the piston 25 is advanced forwardly of or with respect to the piston 20.

Figure 5:
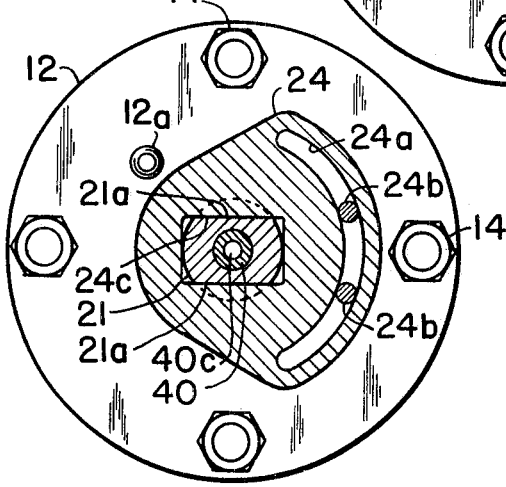
FIGURE 5 is a horizontal section on the scale of and taken along line V—V of FIGURE 1.
Figure 5A:
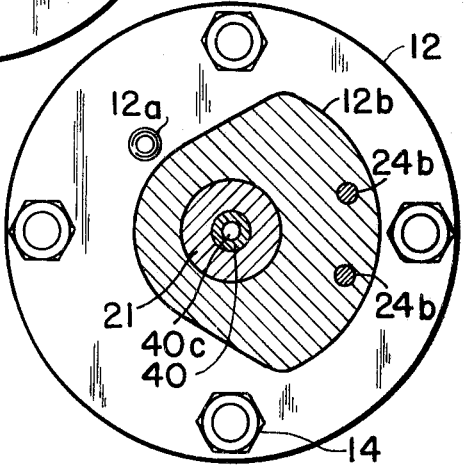
FIGURE 5A is a horizontal section on the scale of and taken along the line VA—VA of FIGURE 1.
Figure 6:
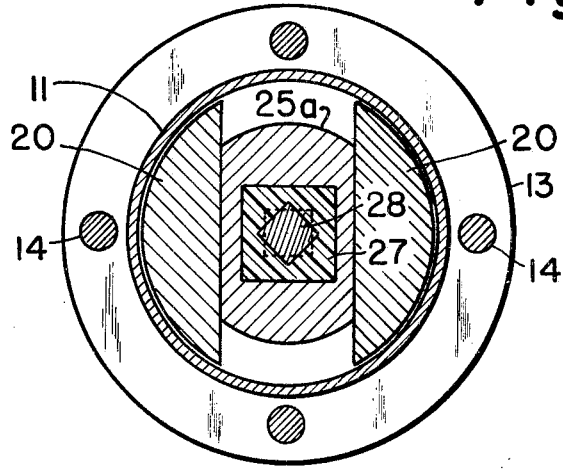
FIGURE 6 is a horizontal section on the scale of and taken along line VI—VI of FIGURE 1.

Referring particularly to FIGURES 1, 5A and 7 of the drawings, the stem 21 projects substantially centrally through a central open portion or bore 12c of the upper or back cover part 12 and has opposed flat side surface portions 21a (see FIGURE 5) that have a complementary fit within corresponding flat sides 24c of a central hole portion of an adjustment plate member 24, such that the stem 21 is free to move longitudinally or axially of the plate member 24 but can only rotate with such plate member. Upper end portion 21c of the stem 21 has an external or male threading thereabout for receiving a pair of cooperating adjustment and position lock nuts 23 thereon. It will be apparent from a study of FIGURE 1 that the maximum inward or forward advancing movement of the primary or back piston 20 may thus be positively set by the nut means 23. FIGURE 2 shows that maximum inward movement of the primary piston 20 is accomplished when th nut means 23 abuts the upper face of the adjustment plate 24. As shown in FIGURE 1, the stem 21 is sealed-off as to its joint with respect to the top cover part or member 12 by a resilient O-ring gasket 16.

To provide means for introducing and exhausting fluid with reference to the central chamber B, the screw 40 is positioned to extend fully along the bore portion 21d of the stem 21 and the upper end head portion 20a of the piston 20. The stem or guide shaft 21 is provided, as particularly shown in FIGURES 1 and 9, at its upper end with a male threaded portion 40b to adjustably-engage an upper female or internally-threaded portion 21b of the stem 21 (see also FIGURE 7). The extreme upper end of the screw 40 has a tapped end 40a, as in the case of the ports 12a and 13a, to provide for the introduction of fluid through the passageway or port 40c into the central chamber B as well as for exhausting fluid therefrom. A lock nut 42 is shown in FIGURE 1 as positioned on the upper threaded portion 40b to abut the upper end of the stem 21 and thus lock the screw 40 in a suitable adjusted relation with respect to the stem. Also, the joint between the bore 21d of the stem 21 and the outer portion of the screw 40 may be sealed-off by a suitable resilient O-ring gasket 41, as disclosed in FIGURE 1.

Figure 4:
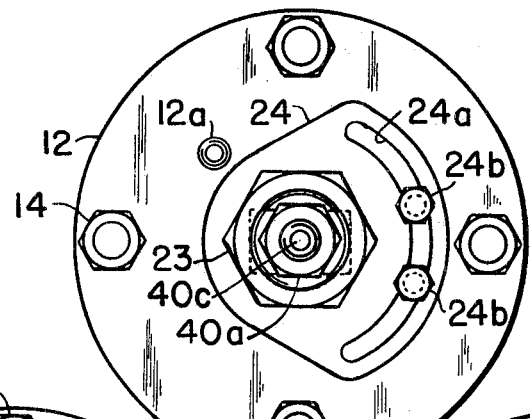
FIGURE 4 is an enlarged top plan view of the actuator device of FIGURES 1 to 3, inclusive.

The adjustment plate member 24 is particularly illustrated in FIGURES 1, 4 and 5. It is shown adjustably-secured on upper portion 12b (see FIGURE 5A) of the cover part or member 12 by a pair of threaded bolts 24b and adjustably through the agency of such bolts and an arcuate or peripherally-extending closed-end slot 24a. It will thus be apparent that when the bolts 24b are loosened in their positioning within the cover part 12 that the plate 24 can be turned or rotated about 42° along the slot 24a to thus adjust the angular relation of it and the stem 21, and thus of the primary piston 20. In this manner, the most suitable operating position of the piston 20 may be provided and adjustment may be made to compensate for wear, and to provide an adjustable setting of the actuator relative to the valve opening in the starting or down positions 20 and 25.

As illustrated particularly in FIGURES 1 to 3, inclusive, the lower or front cover part or member 13 carries a thrust bearing assembly 30 for a drive shaft 29 that, at one end, has a socket portion 29a extending downwardly or forwardly-outwardly through the closure member 13 and a bottom or front end retainer member or plate 35. The socket portion 29a may be a conventional wrench flat type of socket for mounting on a wrench flat end portion of a drive shaft 38 of a valve that is to be actuated. The drive shaft 29 is sealed as to its joint with respect to the bottom cover member 13 by a resilient O-ring 31 and as to the joint defined with respect to the retainer member or plate 35, by a resilient O-ring gasket 37. Peripherally spaced-apart bolts 36 extend through the retainer member 35 and are threadably-received by the bottom end of the cover member 13 to mount the retainer member thereon. At its inner or upper end, the drive shaft 29 is provided with a male helix portion 28 that is complementary with and mates with a wear-resistant, drive-socket, female helix insert 27 that is carried withtin a central hollow portion of the secondary piston 25, as particularly defined by the sleeve portion 25b thereof.

It will be apparent to those skilled in the art, although the device of the invention is particularly suitable for multi-stage or multi-port valve operation and makes practical utilization of a compressible fluid, such as air, that it can also be applied to conventional applications, such as a straight line valve, and to the use of a non-compressible fluid, such as water or oil. It will also be apparent that the movement described as forward movement may be a brackward movement in the sense of the valve means that is to be actuated, and vice versa; also the first stage of forward movement may be set in accordance with the invention, as by means of the nut means 23, to provide a desired percentage of valve operation or opening, for example, a 30, 60 or 90° plus or minus rotative movement. Also, the second stage of forward movement, as accomplished by the secondary piston 25, can be set by adjusting the screw 40 to provide a suitable desired amount of angular movement or rotation up to plus or minus 90° at which, for example, the valve may be fully open. By utilizing a dual and individual type of piston actuation or movement in translating fluid force into rotative mechanical valve actuating movement, it is possible in accordance with the invention, to positively-mechanically limit each stage of movement to a desired angular relation in an accurate manner. Maximum efficiency of utilization of matching helical drive portions 27 and 28 of the device is also accomplished.

It will be noted that descreasing the pitch of the helix 28 out of proportion to the diameter of the operating spacing provided by the housing 10 will cause a loss in delivered torque to the drive shaft 29. Although there is no definite radial or linear formula by which an exact determination can be made as to the best operating condition, it has been determined that if the lead of the helix portions is decreased and the stroke is maintained at the same value, that an increased rotational travel of the drive shaft 29 and a decrease of torque delivered can be obtained. As distinguished from the helix shown in the previously mentionad John et al. patent, I prefer to double the lead of the helix 28 such that 180° plus or minus rotation may be effected with a reduction in torque required. However, the torque may be increased by increasing the diameter of the operating spacing in the housing. Also fluid control valving may be arranged in any suitable manner or automatic controls may be used to obtained suitable sequences or reversal of the procedure.

It will thus be apparent to those skilled in the art that various procedural and operating changes may be made utilizing the invention disclosed herein and that various delections, additions and modifications may be made as to the illustrated apparatus without departing from the spirit and scope of the invention as represented by the claims.

What I claim is:

1. An improved fluid pressure operated device for actuating a rotatory valve which comprises, a housing having a central body part and front and back cover parts defining a longitudinally-extending operating spacing therein, a pair of complementary pistons operatively-positioned within the spacing of said housing for longitudinal movement therealong, one of said pistons being a primary piston and having a stem extending outwardly through said back cover part, said primary piston being operatively-positioned for movement within the spacing of said housing, each of said cover parts having a port for introducing fluid into and exhausting fluid from opposite ends of the spacing within said housing, said primary piston having a central chamber defined by enclosing side and back portions thereof and open forwardly to the spacing within said housing, a bore portion extending along said stem and through the back portion of said primary piston to said central chamber, the other piston being a secondary piston operatively-positioned within the central chamber of said primary piston and having a front head portion operatively-positioned for movement within the spacing of said housing, said primary piston defining a back operating chamber within the spacing of said housing when it is advanced therewithin by an application of positive fluid pressure to the port of said back cover part, said secondary piston defining a central operating chamber within said primary piston when it is advanced forwardly therewithin by application of positive fluid pressure along said bore portion, said secondary piston defining a forward operating chamber within the spacing of said housing when it is retracted therewithin by an application of positive fluid pressure to the port of said front cover part, an operating shaft rotatably-carried by said front cover part and extending outwardly therefrom for rotatably-operating the valve and having a helix portion extending substantially centrally within said secondary piston, said secondary piston having a longitudinally-extending mating helix portion operatively-engaging the helix portion of said operating shaft for rotating said shaft when said primary and secondary pistons are moved longitudinally backwardly and forwardly within the spacing of said housing, and an adjustment screw positioned to extend within and along said bore portion and adjustable with respect thereto for limiting the maximum backward positioning of said secondary piston within the central chamber defined by said primary piston.

2. In a device as defined in claim 1, said stem and said back cover part having adjustable cooperating means for limiting maximum forward stroke movement of said primary piston within the spacing of said housing.

3. In a device as defined in claim 1, a plate member secured on said back cover part, said stem cooperatively extending outwardly through said plate member, and adjustment nut means mounted on said stem and cooperating with said plate member for limiting the maximum forward movement of said primary piston within the spacing of said housing.

4. In a device as defined in claim 3, means rotatably-adjustably securing said plate member on said back cover part, and said stem and said plate having complementary interfitting portions adapted to permit longitudinal movement of said stem with respect to said plate member and to prevent rotative movement of said stem independently of said plate member.

5. In a device as defined in claim 3, said plate member having a central opening therethrough provided with opposed flat portions, said stem having complementary opposed flat portions positioned between said opposed flat portions of said central opening for preventing relative rotation therebetween, said plate member having a peripheral slot portion therein, and bolt means adjustably-secured on said back cover part and extending in a cooperating relation through said slot portion for adjustably-securing said plate member and said stem in a selected angular relation with respect to said housing.

6. In a device as defined in claim 1, said adjustment screw having a longitudinal fluid passageway therealong that is open to the central chamber of said primary piston, and said screw being adjustably-positioned for longitudinal movement within said bore portion to, in one position, at its forward end lie substantially flush with the back portion of said primary piston and to, in another position, extend forwardly of the back portion to limit a back stroke positioning of said secondary piston within the central chamber of said primary piston.

7. In a device as defined in claim 6, said screw having an externally-threaded back end portion extending outwardly beyond said stem, and nut means mounted on said threaded back end portion of said screw to abut said stem for locking said screw in a longitudinally-adjusted positioning with respect to said stem.

References Cited
UNITED STATES PATENTS

| | | | |
|---|---|---|---|
| 1,828,965 | 10/1931 | Fuller et al. | 92—33 |
| 2,135,959 | 11/1938 | Barnhart | 92—31 |
| 2,358,826 | 9/1944 | Purat | 92—13 |
| 2,831,464 | 4/1958 | Lillquist | 92—62 |
| 2,974,646 | 3/1961 | Miller et al. | 92—33 |
| 3,141,387 | 7/1964 | Geyer | 92—33 |
| 3,253,517 | 5/1966 | John et al. | 92—33 |
| 3,371,553 | 3/1968 | Miner | 92—13 |
| 3,392,909 | 7/1968 | Turner | 92—13 XR |

MARTIN P. SCHWADRON, Primary Examiner

L. J. PAYNE, Assistant Examiner

U.S. Cl. X.R.

92—31, 33, 70

PO-1050
(5/69)

UNITED STATES PATENT OFFICE
CERTIFICATE OF CORRECTION

Patent No. 3,508,472　　　　　　　　　Dated April 28, 1970

Inventor(s) Harry T. Hartwick

It is certified that error appears in the above-identified patent and that said Letters Patent are hereby corrected as shown below:

Column 4, line 46, change "th" to --the--.

Column 5, line 10, before "20" insert --of pistons--; line 41, change "brackward" to --backward--.

Column 6, line 7, change "delections" to --deletions--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents